Figure 1:
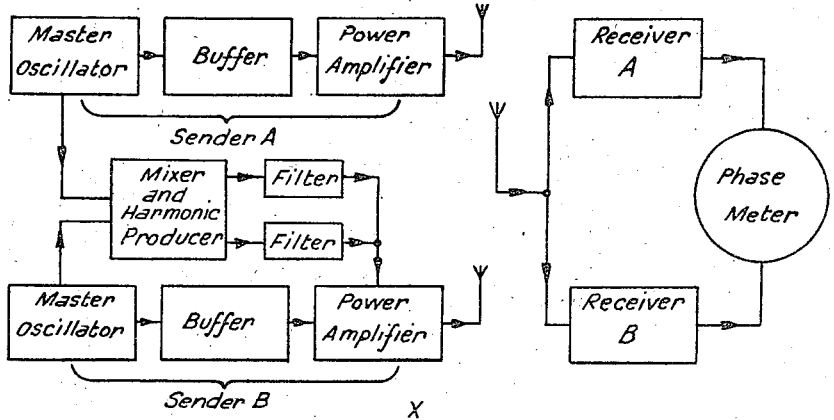

July 1, 1947.  H. FLETCHER  2,423,305

RADIO NAVIGATIONAL SYSTEM

Filed July 15, 1944

Inventor
Herbert Fletcher
By Loyd Hall Sutton
Attorney

Patented July 1, 1947

2,423,305

UNITED STATES PATENT OFFICE 2,423,305

RADIO NAVIGATIONAL SYSTEM

Herbert Fletcher, Slough, England

Application July 15, 1944, Serial No. 545,162
In Great Britain September 9, 1942

Section 1, Public Law 690, August 8, 1946.
Patent expires September 9, 1962

4 Claims. (Cl. 250—11)

This invention relates to improvements in radio navigational systems and more particularly to improvements in radio navigational beacon systems which enable the bearing or position of a receiving station to be determined.

Radio navigational beacons of the type with which this invention is concerned employ a plurality of separated radiating systems and by measuring the relative phase displacement between the electromagnetic waves received at a point from the spaced radiators, it is possible to discover the difference of the distances from the receiving point to the various radiators and thus discover the bearing of the receiving point with respect to the beacon system.

One known system of this type employs three separate radiating systems. In one method of operating this system the three radiators $A_1$, $A_2$ and $A_3$ are fed with currents, respectively of the following frequencies:

$A_1$, an unmodulated carrier, frequency $f$.

$A_2$, an unmodulated carrier, frequency $(f+n)$ where $n$ is a low frequency.

$A_3$, a carrier, frequency $f_1$, amplitude modulated with frequency $n$, where $f_1$ is considerably different from $f$.

At a receiving point the fields from $A_1$ and $A_2$ are separated and caused to produce a beat frequency $n$, and also the field from $A_3$ is separated and demodulated to produce the frequency $n$. The phase displacement between these two components of frequency $n$, which is measured on a phasemeter, can be shown to be equal to the phase displacement which would exist due to the path difference, between two carrier waves of frequency $f$ radiated from the aerials $A_1$ and $A_2$.

By means of such a scheme, therefore, a measurement of the relative phase displacement of two low frequency components gives an indication of the difference of the distances separating a radio receiving station from two different transmitting stations forming a portion of the beacon system. Moreover, although the phase measurement is made at a low frequency, the measurement is in effect a measurement of the phase displacement between two equal carrier frequencies so that the accuracy is greatly improved and the required spacing of the transmitting aerials much reduced compared with other types of system in which a path difference from two spaced transmitters to a receiving point, is determined by measuring the relative phase displacement of the modulation envelopes of the two transmissions.

For example, if the spacing between the two relevant transmitting aerials $A_1$ and $A_2$ of the system referred to above, is made equal to one half wavelength of the carrier frequency $f$, then as the receiving point is moved around in bearing, relative to the centre of the line joining the aerials $A_1$ and $A_2$, a 90° change in bearing will cause a 180° change in the relative phases of the two low frequency components fed to the phase measuring device.

The loci of points of equal indication of phase or of equal path difference to the two transmitting aerials concerned, form a series of confocal hyperbolae with the aerial locations as foci. For receiving points whose distances are large compared with the aerial spacing, the hyperbolae have for practical purposes reached their assymptotes, which form radials from the mid point between the aerials.

Thus the phase difference measuring device at the receiving station can be calibrated to measure directly the azimuth angle relative to the centre point between the sender positions.

An object of the present invention is to provide an improved navigational beacon of the kind in which the measurement of the phase difference is made at low frequency.

According to the invention there is provided a radio navigational beacon of the type referred to which enables the path difference between a receiving station and two spaced transmitting stations, or in effect the bearing of the receiving station with respect to the mid point of the line joining two transmitting stations, to be determined, wherein the two carrier waves radiated by the two transmitting stations are of different frequency and wherein one such carrier wave is unmodulated while the other carrier wave is modulated by one or more low frequencies which are so related to the frequency difference between the two carrier frequencies, that one of the sidebands produced differs in frequency from one of the carrier frequencies by an amount equal to the frequency difference between another of the sidebands and the other carrier frequency, the magnitude of this amount being such that each carrier wave and the associated sideband can be segregated in a separate channel at the receiving station.

The low frequency modulating currents are obtained from currents derived from the two transmitting stations which are related in frequency to the two carrier frequencies. According to a feature of the invention, each transmitting station includes a master oscillator operating at a sub-multiple of its carrier frequency, in which case portions of the outputs of the two master oscillators are combined in a mixing circuit to produce a beat note and harmonics thereof, the required low frequency currents being obtained by selection from these by means of filters. Alternatively, the master oscillators may operate at the carrier frequencies, in which case the required low frequencies are obtained by frequency division of the beat note in a suitable circuit.

At the receiving point two receiving channels are employed. One channel is arranged to select the unmodulated carrier and the sideband of the modulated carrier which is associated with the unmodulated carrier. The phase of the heterodyne output from this channel is a function of the azimuth angle and path-length to the mid point of the two transmitting aerials. The second channel is arranged to select the modulated carrier and that one of its sidebands which is separated therefore by an amount equal to the separation of the other carrier and its associated sideband so that the frequency of the heterodyne output from this channel is the same as that obtained from the first channel. The phase of this second output is a function only of the distance of the receiving point from the mid point of the transmitting aerials. The phase difference between the two outputs, measured on a phase meter, is therefore a function of the azimuth angle.

The theory underlying the invention and the method of carrying it into effect will be described by way of example with reference to the accompanying drawings, in which—

Figure 2:
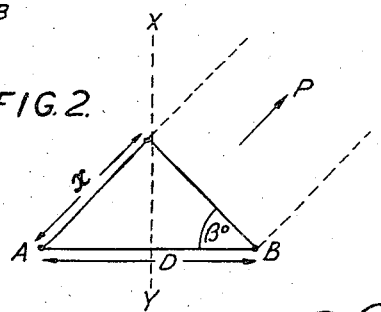
Figure 3:
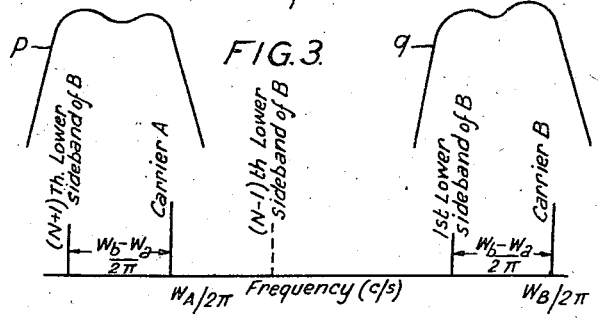
Figure 4:
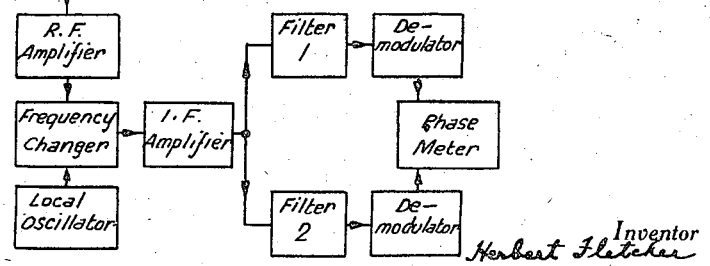

Figure 1 shows a block diagram of the general arrangement of the system; Figures 2 and 3 are explanatory diagrams; and Figure 4 shows an alternative arrangement of the receiving system.

Consider two senders A and B, Fig. 1 comprising master oscillators of angular frequencies $W_a$ and $W_b$, where $(W_b-W_a)/2\pi$ is a few kilocycles, buffer and frequency multiplying stages and power amplifier stages feeding carriers of angular frequency $W_A$ and $W_B$ to aerials, where $W_A=N\times W_a$ and $W_B=N\times W_b$.

A small proportion of the master oscillator output from both senders is fed to mixing and harmonic producing circuits of a form well known in the art which produces a beat note together with its harmonics. The fundamental angular frequency of this beat note will be equal to $$\frac{1}{N}\times(W_A-W_B)$$

The beat note and a selected harmonic or harmonics are passed by filters and employed to modulate the carrier $W_B$. Carrier $W_A$ is unmodulated.

Receiver B is tuned and has such a selectivity that it picks up the carrier frm sender B and one of the side bands due to the modulating angular frequency $$\frac{1}{N}(W_A-W_B)$$

and rejects all else. The other receiver A is tuned to pick up only the unmodulated carrier from sender A and an adjacent side band produced by the modulation of the carrier from sender B with a harmonic of the beat angular frequency $$\frac{1}{N}(W_A-W_B)$$

This harmonic is so chosen at the transmitting end that the heterodyne outputs from both receivers A and B are equal in frequency and are equal to the angular frequency $(W_a-W_b)$ or a harmonic of that frequency. These two heterodyne outputs are fed to a phasemeter where their relative phase displacement is measured. The phase meter may be of any known or suitable type or the phase relationship may be determined in known manner by the use of a cathode ray oscilloscope with a circular time base locked to the modulating frequency.

The relationships between the various frequencies referred to above may be best understood by means of numerical examples. If $W_a/2\pi$ and $W_b/2\pi$ are 1001 kc./s. and 1003 kc./s. respectively and N is 4 then $W_A/2\pi$ and $W_B/2\pi$ are 4004 and 4012 kc./s. respectively. The fundamental beat note is 2 kc./s. and this and a harmonic equal to 10 kc./s. are fed to modulate the carrier from sender B producing sidebands of frequency 4010 kc./s., 4014 kc./s., 4002 kc./s. and 4022 kc./s. The carrier of 4012 kc./s. and the sideband of 4010 kc./s. are selected by receiver B to the exclusion of all else and produce a heterodyne output of 2 kc./s., while receiver A selects the unmodulated carrier from sender A of 4004 kc./s. and the sideband of 4002 kc./s., to the exclusion of all else, and thus also produces a heterodyne output of 2 kc./s.

In the particular case where N is equal to 2, i. e., frequency doubling is employed between the master oscillator and power amplifier stages, if the separation of $W_a$ and $W_b$ is adequate, it is not necessary to employ any harmonics of the beat frequency. The mixing and filter circuits shown in Fig. 1 are thus arranged to produce only the beat frequency, which is used to modulate the carrier from sender B. Receiver A is arranged to select only the carrier from sender A and the sideband of the carrier from sender B, which lies midway between $W_A/2\pi$ and $W_B/2\pi$ in the frequency spectrum while receiver B is arranged to select only the carrier from sender B and the other sideband.

In the case in which no frequency multiplication is employed between the master oscillator and output stages, the angular carrier frequencies are $W_A$ and $W_B$ and the fundamental beat angular frequency is $W_A-W_B$. By deriving from the beat frequency a quantity $$(W_a-W_b)=(W_A-W_B)/N$$

where $(W_a-W_b)$ is obtained by frequency dividing circuits in known manner, the system according to the invention can still be operated and the explanation already given holds. The apparatus employed is the same as shown in Fig. 1 except that the filters are replaced by frequency dividing circuits fed with the beat frequency from the mixer.

Figure 2 shows diagrammatically in plan the position of the two senders A and B, separated by a distance D, a receiving point P being situated at a distance large compared with D so that the angle between the line joining A and B and the direction of P is $90-\beta°$. The line XY is the perpendicular bisector of the line AB.

The voltages produced by the master oscillators of the senders A and B can be represented by:

$$A \sin W_a t \text{ and } B \sin (W_b t+\phi) \qquad (1)$$

where A and B are the amplitudes for senders A and B respectively and $\phi$ is an arbitrary phase constant.

If a feeder cable from sender A conveys a portion of the master oscillator output to a unit at sender B, where it is mixed with the corresponding quantity from sender B, then the two voltages applied to the grid of the mixer valve can be presented by—

$$A' \sin W_a(t-D/v) \quad (2)$$
$$B' \sin (W_b t + \phi)$$

at time $t$, where $v$ is the velocity of the voltage wave from sender A along the feeder line to the mixer unit.

If the mixer valve is operated on a non-linear portion of its characteristic, then one component of the resultant of the combination will be a quantity $$A'B'\left[\cos\left[(W_b-W_a)t+\phi+\frac{DW_a}{v}\right]-\cos\left[(W_b+W_a)t+\phi-\frac{DW_a}{v}\right]\right] \quad (3)$$

$W_b$ is greater than $W_a$ and $$\frac{(W_b-W_a)}{2\pi}$$

is of the order of a few kilocycles per second.

The first cosine term is the "beat" note, which can be selected from the output for amplification, and the final output used to modulate the carrier of sender B.

Suppose the phase shift in amplification and modulation is $\theta$ electrical radians, the phase term of the modulation note will be $$\cos\left[(W_b-W_a)t+\phi+\theta+\frac{DW_a}{v}\right] \quad (4)$$

Now let the carrier angular frequencies of senders A and B be $W_A$ and $W_B$ respectively, then $$W_A = N \times W_a$$

and $$W_B = N \times W_b \quad (5)$$

where N is an integer greater than 1 for the case of frequency multiplication between the master oscillator and power amplifier stages of the senders.

The modulated carrier from sender B can be represented at time $t$ by the quantity.

$$B\left[1+\sum K_N \cos N\left\{(W_b-W_a)t+\phi+\theta+\frac{DW_a}{v}\right\} \sin (W_B t + N\phi)\right] \quad (6)$$

where $K_N$ = depth of modulation for the Nth harmonic of the "beat" modulation note.

Consider the arrival of the carrier from sender A and the modulated carrier from sender B, at a distant point P.

Since the Nth harmonic of the "beat" note, if used to modulate sender B, would produce a side band which would coincide and interfere with the carrier from sender A, it must therefore be suppressed. Consider the (N−1)th and (N+1)th harmonics of the "beat" modulation note, which used separately each have a frequency separation of $(W_b-W_a)/2\pi$ from the carrier from sender A, which is identical with the frequency separation of the carrier from sender B and its side bands due to the fundamental modulating frequency. This may be seen by reference to Figure 3 which indicates diagrammatically the two carriers from senders A and B with a frequency separation of $N \times (W_b-W_a)/2\pi$. Due to the modulation of the carrier from sender B with the beat frequency $(W_b-W_a)/2\pi$ side-bands are produced, and the first lower side-band is indicated, separated by $(W_b-W_a)/2\pi$ from $W_B/2\pi$. Also the lower side bands produced by the (N−1) and (N+1)th harmonics of the fundamental beat frequency are indicated and it is obvious that both of these have the same frequency separation of $(W_b-W_a)/2\pi$ from the carrier from sender A.

Referring back to Figure 2 assume that the fundamental and (N+1)th harmonics of the beat frequency are employed to modulate the carrier from sender B. Also since AP and BP are sensibly parallel for a remote receiving point $$AP = BP + X = d + x$$

At time $t$ the carrier emitted by sender A can be represented by $$A \sin W_A \cdot t \quad (7)$$

Thus at time $t$, the expression for the carrier A at the point P is:

$$A'' \sin W_A\left(t-\frac{d+x}{c}\right) \quad (8)$$

where c is the velocity of light.

Similarly the expression for the carrier B at the point P, modulated with the fundamental and (N+1)th harmonic of the beat note, is:

$$B''\left[1+\left\{K_1 \cos\left[(W_b-W_a)\left(t-\frac{d}{c}\right)+\phi+\theta+\frac{DW_a}{v}\right]+K_{N+1}\cos(N+1)\left[(W_b-W_a)\left(t-\frac{d}{c}\right)+\phi+\theta+\frac{DW_a}{v}\right]\right\}\right] \sin\left[W_B\left(t-\frac{d}{c}\right)+N\phi\right] \quad (9)$$

This expression may be resolved into—

$$B'' \sin\left[W_B\left(t-\frac{d}{c}\right)+N\phi\right] \quad (10)$$

which represents the carrier;

$$\tfrac{1}{2}B''K_1 \sin\left\{[W_B-(W_b-W_a)]\left[t-\frac{d}{c}\right]+(N-1)\phi-\theta-\frac{DW_a}{v}\right\} \quad (11)$$

which represents the lower side band due to the beat note fundamental; and $$\tfrac{1}{2}B''K_{N+1} \sin\left\{[W_B-(N+1)(W_b-W_a)]\left[t-\frac{d}{c}\right]-\phi-(N+1)\left(\theta+\frac{DW_a}{v}\right)\right\} \quad (12)$$

which represents the lower side band due to the (N+1)th harmonic of the beat note.

Now $W_B = N \times W_b$ and $W_A = N \times W_a$; therefore, $$[W_B-(N+1)(W_b-W_a)] =$$
$$[W_B-NW_b+NW_a-(W_b-W_a)] =$$
$$[W_A-(W_b-W_a)] \quad (13)$$

Thus the (N+1)th lower side band is seen to have an identical frequency separation from carrier A, as carrier B has from its first order side-band. Similarly the (N−1)th lower side band of B would have the same frequency separation from carrier A, as illustrated in Fig. 3.

Referring now to Figure 3 which illustrates the received frequency spectrum at P if $(W_b-W_a)/2\pi$ is of the order of 5 to 10 kc./s., it is clear that any two of the frequencies could be passed by a selective receiver to the exclusion of the others. Two possible R. F. response curves for the receivers at P, to enable this selection to be carried out are indicated at $p$ and $q$ on Fig. 3.

Consider the carrier from sender A and the (N+1)th lower side band of the carrier from sender B being accepted by the same receiver, then if W is the angular frequency of the receiver local oscillator for this condition the angular frequency of the two signals in the I. F. amplifier will be $(W_A-W)$, and $[W_A-(W_b-W_a)-W]$ respectively. Thus on mixing these signals, the resultant beat note will have an angular frequency $(W_b-W_a)$ which would have been the result of mixing them before the local oscillator. Similarly the phase term of the local oscillator relative to the two signals is not present in the final beat note, which has the same phase as determined by the two inputs.

This leads to the important result that the phase of the receiver output is determined only by the two received R. F. signals (viz., carrier A and the $(N+1)$th lower side band of carrier B, in the case considered) plus a fixed shift for the receiver as a whole, but is quite independent of any phase shift or frequency drift of the receiver local oscillator. Thus an independent receiver can be used to receive the carrier from sender B and its 1st order side bands and the output signal will be of the same frequency as that from the receiver accepting the lower pair of R. F. signals.

The relative phases of the two receiver outputs will be functions only of the received signals and the difference between the constant shifts due to each receiver, say $\alpha$, which arise in the train of sharply tuned circuits, but will not vary so long as the receiver settings remain fixed. The fact that the two receiver local oscillators are not "locked" together but may be of any phase and, indeed, different frequencies relative to each other has no effect on the phase difference between the two receiver outputs. It will be shown below that for fixed frequency operation of the senders, the relative phase of the receiver outputs is a measure of the azimuth angle $\beta$ as measured from the centre point of the line AB.

The phase of the beat note which appears at the output of one of the receivers due to beating the carrier from sender A (Expression 8) with the $(N+1)$th lower side band of the carrier from sender B (Expression 12), will be:

$$(W_b-W_a)\left(t-\frac{d}{c}\right)+\phi+(N+1)\left(\theta+\frac{DW_a}{v}\right)-\frac{xW_A}{c}+\alpha \quad (14)$$

where $\alpha$=difference between the fixed phase shifts of each receiver.
=a constant.

Similarly the phase of the output from the second receiver which is the result of beating the carrier from sender B (Expression 10), with its own first order side band (Expression 11), will be:

$$(W_b-W_a)\left(t-\frac{d}{c}\right)+\phi+\theta+\frac{DW_a}{v} \quad (15)$$

Thus the difference in phase between these outputs is $$\frac{xW_A}{c}-N\left(\theta+\frac{DW_a}{v}\right)-\alpha \quad (16)$$

from which it will be seen that the only term affected by changing the position of P relative to the senders is $$\frac{xW_A}{c}$$

and since $$\frac{x}{c}=\frac{D\sin\beta}{c}$$

the measurement of the phase difference affords a measure of $\beta$ which is the azimuth angle as measured clockwise from XY.

Since after the setting-up operation $\theta$ and $\alpha$ are constant it may be seen from the Expression 16 that the only variation for a given direction, i. e., for a fixed value of $x$, is produced by variation in $W_a$; or in $W_b$, if the modulation is applied to carrier A instead of carrier B as previously considered.

The beacon system in common with any other system employing two spaced aerials, is inherently symmetrical about the vertical plane containing the two aerials, so that any point has a conjugate image point relative to the plane of symmetry, which has an identical phase expression.

Now the term in Expression 16 which is a function of the azimuth angle, i. e., the space-phase term, is $$\frac{xW_A}{c}$$

electrical radians which may be written $$\frac{2\pi D \sin\beta}{\lambda_A}$$

where $\lambda_A$ is the wave-length of emitted signal of sender A.

Thus with the perpendicular bisector of AB as the datum line XY a change in angle of arc of $\beta$ from XY produces a phase variation of $$\frac{2\pi D \sin\beta}{\lambda_A}$$

Hence the phase change is proportional to $\sin\beta$ and the discrimination of angle of arc is thus largest for small angles on either side of the datum line where $\sin\beta=\beta$.

The rate of change of phase with angle of arc (i. e., discrimination) is given by $$\frac{d}{d\beta}\cdot\frac{2\pi D \sin\beta}{\lambda_A}=\frac{2\pi D \cos\beta}{\lambda_A}$$

electrical radians per radian of arc. For small values of $\pm\beta$ measured from XY this approximately equals $$\frac{2\pi D}{\lambda_A} \quad (17)$$

Thus for small deviations $(\pm\beta)$ from the line XY (Fig. 2) the discrimination is a constant; after which it varies cosinusoidally, being zero for points on the line AB (Fig. 2). Thus the line XY represents the centre-line for maximum discrimination. As can be seen from (17) discrimination is dependent upon the value of $D/\lambda_A=n$, say for any given azimuth angle.

Thus the largest possible value of $n$ should be used consistent with practical possibilities.

The phase shift as $\beta$ changes from 0–90° is 360 $n$° and therefore since the phase variation is symmetrical about XY the phase shift from $\beta=-90°$ to $+90°$ is $2\times 360\ n°$. Thus if $n=\frac{1}{2}$, the complete phase scale of 360 is utilized in the region bounded to one side by the beacon vertical plane of symmetry containing the two aerials. If the value of $n$ is increased, then greater discrimination results but a counter system is required to allow measurements of phase angles exceeding 360° if navigational facilities between the entire region enclosed by $\beta=\pm90°$ is required.

In the main however, the provision of a centre-line is sufficient and departure from the course line would not be such as to necessitate measurements of phase exceeding 360°.

An angular deviation of $\pm\beta$ from XY involves a space-phase shift of $360\ n\sin\beta$. When the maximum permissible phase measurement is 360°, then the corresponding angular deviation of arc is given by the following:
Thus for
$$n=2, \beta=\pm 30°$$
$$n=4, \beta=\pm 14° \ 30'$$
$$n=8, \beta=\pm 7° \ 12'$$

An important feature of the system according to the invention is that it is unaffected by random phase variations in the carrier from either transmitter. If in such a system the path difference from the receiving point to the two senders was determined by a direct measurement of carrier phase difference then a constant steady phase relationship would have to be maintained between the two carriers transmitted. However, the system according to the invention is self correcting for any changes of phase of either carrier due to the fact that a compensating change of phase of the modulation frequency takes place. This may be readily understood by consideration of an example. Suppose that a jump of $+\phi'$ in the phase of the carrier from sender A occurs, while the phase of the carrier from sender B remains unaltered. The phase of the master oscillator of sender A will then have changed in phase by $$+\frac{\phi'}{N}$$

and the fundamental beat frequency employed for modulation will also change in phase by $$+\frac{\phi'}{N}$$

Assuming that the (N+1)th harmonic of the beat frequency is also used for modulation, this will change in phase by $$\frac{(N+1)\phi'}{N}$$

The phase of the two relevant side bands will also therefore have changed in phase by $$\phi' - \frac{\phi'}{N}$$

and $$\phi' - \frac{(N+1)\phi'}{N}$$

which equals $$-\frac{\phi'}{N}$$

respectively. These two sidebands produce heterodyne outputs with the carriers from senders A and B of reference phases $+\phi$ and zero respectively so that the phases of the two beat frequency outputs will change by $$0 - \left(\frac{-\phi'}{N}\right) = \frac{\phi'}{N}$$

and $$\phi' - \left(\phi' - \frac{\phi'}{N}\right) = \frac{\phi'}{N}$$

respectively. Thus for a given receiving position no change on the phase measuring device will be produced.

An error will be produced with the system according to the invention if the carriers from senders A and B are not maintained constant in frequency.

In practice it is impossible to maintain the angular frequencies $W_A$ and $W_B$ exactly constant but if the master oscillators are crystal controlled, then the frequency deviation can be maintained well within $\pm 0.01\%$ of the stated frequencies. Thus the error, due to the terms $$\frac{xW_A}{c} \text{ and } \frac{-NDW_a}{v}$$

which equals $$-\frac{DW_A}{v},$$

in Expression 16 will be within the limits $$\pm \frac{xW_A}{c} \times 10^{-4} \text{ and } \mp \frac{DW_A}{v} \times 10^{-4}$$

electrical radians respectively.

The limit values of $x$ are $\pm D$, the sign depending upon the quadrant in which P is located. Thus the overall maximum error will occur when $x=D$, or P falls on the line BA produced. Now if a practical value for $v$ of $0.7C$ is assumed, the maximum error may be taken as, $$\frac{W_A}{c}\left(D+\frac{D}{0.7}\right) \times 10^{-4}$$

electrical radians.

$$=\frac{360}{\lambda_A} \times 2.43 \times 10^{-4} \times D$$

electrical degrees

This maximum error in phase difference occurs when the point P lies on the line BA, but its importance may be gauged by considering the relationship between phase difference and degrees of arc measured from the line XY, the phase change for a given change of arc being maximum on the line XY.

Now the value of $x$ for one degree of arc from the line XY is shown in Expression 17 to be $$\frac{2\pi D}{\lambda_A}$$

and therefore if the error in phase calculated above operated on the line XY, the error in bearing would be $$\frac{360}{\lambda_A} \times 2.43 D \times 10^{-4} \times \frac{\lambda_A}{2\pi D}$$

which equals $0.0138°$. The actual values of bearing error will be less than this and will therefore, in any case, be negligible.

The invention may be employed for locating the position of a receiving point by utilising two sets of pairs of senders operated in accordance with the invention, but on different carrier frequencies and so arranged that two bearings obtained at a receiving point can be plotted to produce an intersection which locates the position of the receiving station.

If it is merely required to use the invention for providing a course line or indication of bearing only, it is only necessary to set the scale of the phasemeter at the receiving station to indicate correct bearing. This may be done by adjusting the phasemeter when the receiving station is on the desired course line or has a known bearing with respect to the beacon.

If it is not possible to adjust the phasemeter as previously described, the phasemeter may be set by making use of the symmetry of the system about the plane bisecting the line joining the two transmitting aerials. Thus if the transmitters energising the separate aerials are changed over, the phase indication produced at the receiving point will be that corresponding to the image positive relative to the line of discrimination symmetry XY and the mean of the two phasemeter indications thus obtained will be that corresponding to a receiving point on the perpendicular bisector of the line joining the sender aerials.

The same result may be obtained by arranging to increase both carrier frequencies by an amount equal to the modulation frequency and transferring the modulation to the alternate carrier. This modification can be performed in a single operation by having alternate crystal control of the senders and arranging for the output of the mixer to be switched to the appropriate sender in such a manner that all constant phase shifts remain unaltered.

In order to avoid the complication of two receivers at the receiving station, it is possible to use a single receiver as shown in Figure 4 in which the R. F. and I. F. channels are sufficiently broad to pass the signals from both senders. The required pair of channels are then separated at I. F. frequency by means of two crystal filters 1 and 2 which feed the appropriate signals to demodulators and the phase indicating system.

I claim:

1. A radio navigational beacon for enabling the path difference between a receiving station and two spaced transmitting stations to be determined, said beacon comprising a transmitting station adapted to radiate a first carrier wave, a second transmitting station spaced apart from the first and adapted to radiate a second carrier wave of different frequency from the first, electrical circuits arranged to produce, from currents of frequencies related to the carrier frequencies and derived from the two stations, a plurality of low frequency currents, and means for modulating one of the carrier waves with chosen ones of said low frequency currents, the chosen low frequencies being so related to the difference between the carrier frequencies that one of the sidebands produced differs in frequency from one of the carrier waves by an amount equal to the frequency difference between another of the sidebands and the other carrier wave, the magnitude of the amount being such that each carrier wave and the associated sideband can be segregated in a separate channel at the receiving station.

2. A radio navagational beacon for enabling the path difference between a receiving station and two spaced transmitting stations to be determined, said beacon comprising a transmitting station adapted to radiate a first carrier wave, a second transmitting station spaced apart from the first and adapted to radiate a second carrier wave of different frequency from the first, a master oscillator for each transmitting station, the frequency of each master oscillator being a sub-multiple of the respective carrier frequency, a mixing circuit fed with portions of outputs of the two master oscillators to produce low frequency currents comprising the beat note and harmonics thereof, filters for selecting chosen ones of said low frequency currents, means for modulating one of the carrier waves with the chosen low frequency currents, the chosen low frequencies being so related to the difference between the carrier frequencies that one of the sidebands produced differs in frequency from one of the carrier waves by an amount equal to the frequency difference between another of the sidebands and the other carrier wave, the magnitude of the amount being such that each carrier wave and the associated sideband can be segregated in a separate channel at the receiving station.

3. A radio navigational beacon for enabling the path difference between a receiving station and two spaced transmitting stations to be determined, said beacon comprising a transmitting station adapted to radiate a first carrier wave, a second transmitting station spaced apart from the first and adapted to radiate a second carrier wave of different frequency from the first, a master oscillator for each transmitting station adapted to generate the carrier frequency, a mixing circuit fed with portions of the outputs of the two master oscillators to produce a beat frequency, frequency dividing circuits fed with said beat frequency to produce currents of chosen low frequencies comprising sub-harmonics of said beat frequency, means for modulating one of the carrier waves with the chosen low frequency currents, the chosen low frequencies being so related to the difference between the carrier frequencies that one of the sidebands produced differs in frequency from one of the carrier waves by an amount equal to the frequency difference between another of the sidebands and the other carrier wave, the magnitude of the amount being such that each carrier wave and the associated sideband can be segregated in a separate channel at the receiving station.

4. A radio navigational beacon for enabling the path difference between a receiving station and two spaced transmitting stations to be determined, said beacon comprising a transmitting station adapted to radiate a first carrier wave, a second transmitting station spaced apart from the first and adapted to radiate a second carrier wave of different frequency from the first, a master oscillator for each transmitting station, the frequency of each master oscillator being half that of the respective carrier frequency, a mixing circuit fed with portions of the outputs of the two master oscillators to produce a beat frequency having a frequency equal to half the frequency difference between the carrier waves, and means for modulating one of the carrier waves with said beat frequency, to produce two sidebands each of which differs in frequency from one of the carrier waves by an equal amount of a magnitude such that each carrier wave and its associated sideband can be segregated in a separate channel at the receiving station.

HERBERT FLETCHER.

REFERENCES CITED

The following references are of record in the file of this patent:

UNITED STATES PATENTS

| Number | Name | Date |
| --- | --- | --- |
| 2,144,203 | Shanklin | Jan. 17, 1939 |
| 2,148,267 | Honore | Feb. 21, 1939 |